US008861833B2

(12) United States Patent
Yau et al.

(10) Patent No.: US 8,861,833 B2
(45) Date of Patent: Oct. 14, 2014

(54) SIMULTANEOUS THREE-DIMENSIONAL GEOMETRY AND COLOR TEXTURE ACQUISITION USING SINGLE COLOR CAMERA

(75) Inventors: Shing-Tung Yau, Cambridge, MA (US); Song Zhang, Ames, IA (US); Xiangfeng Gu, Plainview, NY (US)

(73) Assignee: International Press of Boston, Inc., Somerville, MA (US)

( * ) Notice: Subject to any disclaimer, the term of this patent is extended or adjusted under 35 U.S.C. 154(b) by 1155 days.

(21) Appl. No.: 12/388,301

(22) Filed: Feb. 18, 2009

(65) Prior Publication Data

US 2010/0207938 A1    Aug. 19, 2010

(51) Int. Cl.
*G06K 9/00* (2006.01)
*G06T 7/00* (2006.01)
*G06T 1/00* (2006.01)
*G01B 11/25* (2006.01)

(52) U.S. Cl.
CPC .......... *G01B 11/2513* (2013.01); *G06T 7/0057* (2013.01); *G06T 1/0007* (2013.01)
USPC ........... 382/154; 382/100; 382/141; 382/276; 382/284; 382/293; 345/419; 345/581; 356/600; 356/601; 356/602; 356/603; 356/604; 356/605; 356/606; 356/610

(58) Field of Classification Search
None
See application file for complete search history.

(56) References Cited

U.S. PATENT DOCUMENTS

| | | | | |
|---|---|---|---|---|
| 7,545,516 B2 * | 6/2009 | Jia et al. | ......................... | 356/603 |
| 2002/0159075 A1 * | 10/2002 | Sakita | ............................ | 356/618 |
| 2004/0105100 A1 * | 6/2004 | Shirley | ........................... | 356/603 |
| 2007/0115484 A1 * | 5/2007 | Huang et al. | ................... | 356/604 |
| 2007/0206204 A1 * | 9/2007 | Jia et al. | ......................... | 356/604 |
| 2008/0117438 A1 * | 5/2008 | Quirion et al. | ................. | 356/610 |

OTHER PUBLICATIONS

Zhang, "High-speed 3d measurement based on a digital fringe projection technique," 2003, Master's thesis, Stony Brook University, State University of New York.*
Notni et al. "Simultaneous Measurement of 3-D Shape and Color of Objects"; 2002, Proceedings of SPIE vol. 4778.*
Song Zhang, High Resolution, Real-Time 3-D Shape Measurement, Journal of Optical Engineering, Dec. 2006, 12, 45, SPIE, United States.
Xianfeng Gu, Parametrization for Surfaces with Arbitrary Topologies, Doctoral Dissertation, Dec. 2002, Harvard University, Cambridge, MA, United States.

* cited by examiner

*Primary Examiner* — Matthew Bella
*Assistant Examiner* — Jason Heidemann
(74) *Attorney, Agent, or Firm* — Charles C. H. Wu; Charles C.H. Wu & Associates, APC (57) ABSTRACT

A system for simultaneous real-time three-dimensional geometry and color texture acquisition. The system includes a system processor for generating at least three phase shifted black and white fringe patterns with a phase shift of 2 π/3, a light projector adapted to project the fringe patterns onto an object, the projector being electrically connected with the system processor, and a color camera for capturing the fringe patterns to generate at least three raw fringe images. The fringe images are used to calculate a black and white texture image which is further converted to a color image by employing a demosaicing algorithm. The fringe images are also used to calculate a wrapped phase map that is further processed to generate a continuous unwrapped phase map by employing a phase unwrapping algorithm and the unwrapped phase map is converted to co-ordinates using calibrated system parameters for point-by-point three-dimensional shape measurement.

15 Claims, 9 Drawing Sheets

| Pixel | Red | Green | Blue |
|---|---|---|---|
| (2i, 2j) | $\alpha_r I(2i, 2j)$ | $\alpha_g[I(2i+1, 2j) + I(2i, 2j+1)]/2$ | $\alpha_b I(2i+1, 2j+1)$ |
| (2i+1, 2j) | $\alpha_r I(2i, 2j)$ | $\alpha_g I(2i+1, 2j)$ | $\alpha_b I(2i+1, 2j+1)$ |
| (2i, 2j+1) | $\alpha_r I(2i, 2j)$ | $\alpha_g I(2i, 2j+1)$ | $\alpha_b I(2i+1, 2j+1)$ |
| (2i+1, 2j+1) | $\alpha_r I(2i, 2j)$ | $\alpha_g[I(2i+1, 2j) + I(2i, 2j+1)]/2$ | $\alpha_b I(2i+1, 2j+1)$ |

SIMULTANEOUS THREE-DIMENSIONAL GEOMETRY AND COLOR TEXTURE ACQUISITION USING SINGLE COLOR CAMERA

BACKGROUND OF THE INVENTION

1. Technical Field of the Invention

The present invention relates in general to a system and method for real-time three-dimensional shape measurement and color texture acquisition. More specifically, the present invention relates to a system and method for simultaneous real-time high resolution three-dimensional shape measurement and perfectly aligned color texture acquisition using single color camera.

2. Description of the Related Art

Real-time three-dimensional shape measurement technologies are rapidly expanding with applications in numerous diverse areas such as entertainment, medical imaging, aeronautics, security applications, target recognition, etc. With the recent advances in real-time 3D shape measurement technologies, the applications of 3D range scanning technique extends to more areas where color texture of the objects also has become significantly important. For example, in medical imaging field, the color texture conveys vital information for diagnosis.

Over the past decades, several efficient solutions have been demonstrated for 3D shape measurement systems using color. Though, all these methods could successfully measure objects without significant surface color variations, they lack accuracy to a various degree due to the object surface color.

One of the most significant problems caused by using color includes color coupling where the red and green, and the green and blue spectra are overlapping with each other. This may be very difficult to overcome, and may significantly affect the measurement accuracy.

Many attempts are made to alleviate the color coupling problem of the methods. One such solution was to utilize 3×3 matrix to represent the color coupling effect. However, calibrating the color coupling matrix may be complicated since each pixel might have slightly different responses if the lens chromatic aberration is considered. Another approach to deal with the issue was to project red, green and blue channel fringes separately and find out which color channel to use for each point. Even though the method could measure the color objects, it requires 36 color fringe patterns.

Further, 3-CCD color cameras are used to solve the problem of measuring color and geometry simultaneously. This approach is not suitable for real-time 3D shape measurement since more than three fringe images are utilized to deal with color related issues. Moreover, the method may not measure the surface profile properly. For example, for a red object, the green and blue lights will be absorbed and the information carried by these color fringes will be lost. Therefore, an attempt was made to acquire three-dimensional geometry and color texture simultaneously by utilizing unstructured red, green and blue light respectively to obtain color while projecting regular fringe patterns to obtain 3D geometry. However, since this technique requires more images to be projected, it is not suitable for real-time three-dimensional shape measurements.

In summary, efforts were made to measure colorful objects by utilizing a single color camera which either reduce the measurement speed or lack the measurement quality drastically. In order to address the need for acquiring the 3D geometry and color texture simultaneously, a black and white camera is used to acquire the 3D shape information and a color camera to capture the color texture information of the object. Using a color camera and black and white camera involves a complicated registration problem. The registration is to establish a one-to-one mapping between the color camera image and the black/white camera image. Without the assistance of an additional hardware in the system, the mapping is difficult. However, aligning two camera pixel-by-pixel precisely is very challenging.

Hence, it can be seen, that there is a need for a system that develops simultaneous real-time 3D shape measurement and color texture acquisition. Further, the needed system would use less number of fringe images and would reach pixel-level measurement resolution. Moreover, the needed system would employ simple calibration and would be economical.

SUMMARY OF THE INVENTION

To minimize the limitations found in the prior art, and to minimize other limitations that will be apparent upon the reading of the specifications, the present invention provides a system for simultaneous real-time three-dimensional geometry and color texture acquisition of an object. The system comprises a system processor for generating at least three phase shifted black and white fringe patterns by a three-step phase shifting algorithm, a light projector adapted to project the at least three phase shifted black and white fringe patterns onto the object, and a color camera for capturing the at least three phase shifted black and white fringe patterns reflected from the object to generate at least three raw fringe images, wherein the raw fringe images acquired by the color camera are processed by the system processor for the simultaneous real-time three-dimensional geometry and color texture acquisition.

In another aspect of the present invention, a method in accordance with the present invention is a method for simultaneous real-time three-dimensional geometry and color texture acquisition, comprising of projecting the phase shifted fringe patterns onto an object and capturing the reflected fringe patterns to generate raw fringe images. The method further uses the raw fringe images for calculating a wrapped phase map which is processed to generate a continuous unwrapped phase map by employing a phase unwrapping algorithm and converting the continuous unwrapped phase map to co-ordinates using calibrated system parameters for point by point 3D shape measurement. The method uses the same fringe images for producing a black and white texture image which is converted to a color image by employing a demosaicing algorithm.

One objective of the invention is to provide a system for simultaneous 3D shape measurement and color texture acquisition using a single color camera.

Another objective of the invention is to provide a system that uses a color camera having a single imaging sensor with a Bayer mosaic filter.

A third objective of the invention is to provide a system that makes the calibration simple with a red and blue checkerboard by using a single color camera.

Yet another objective of the invention is to provide a cost-effective system.

Still another objective of the invention is to provide system which is less sensitive to surface color variation since it uses black and white fringe patterns.

It is also the objective of the invention to provide a system featuring a high resolution due to pixel by pixel geometry calculation.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part of hereof, and in which is shown by way of illustration specific embodiments in which the invention may be practiced. It is to be understood that other embodiments may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
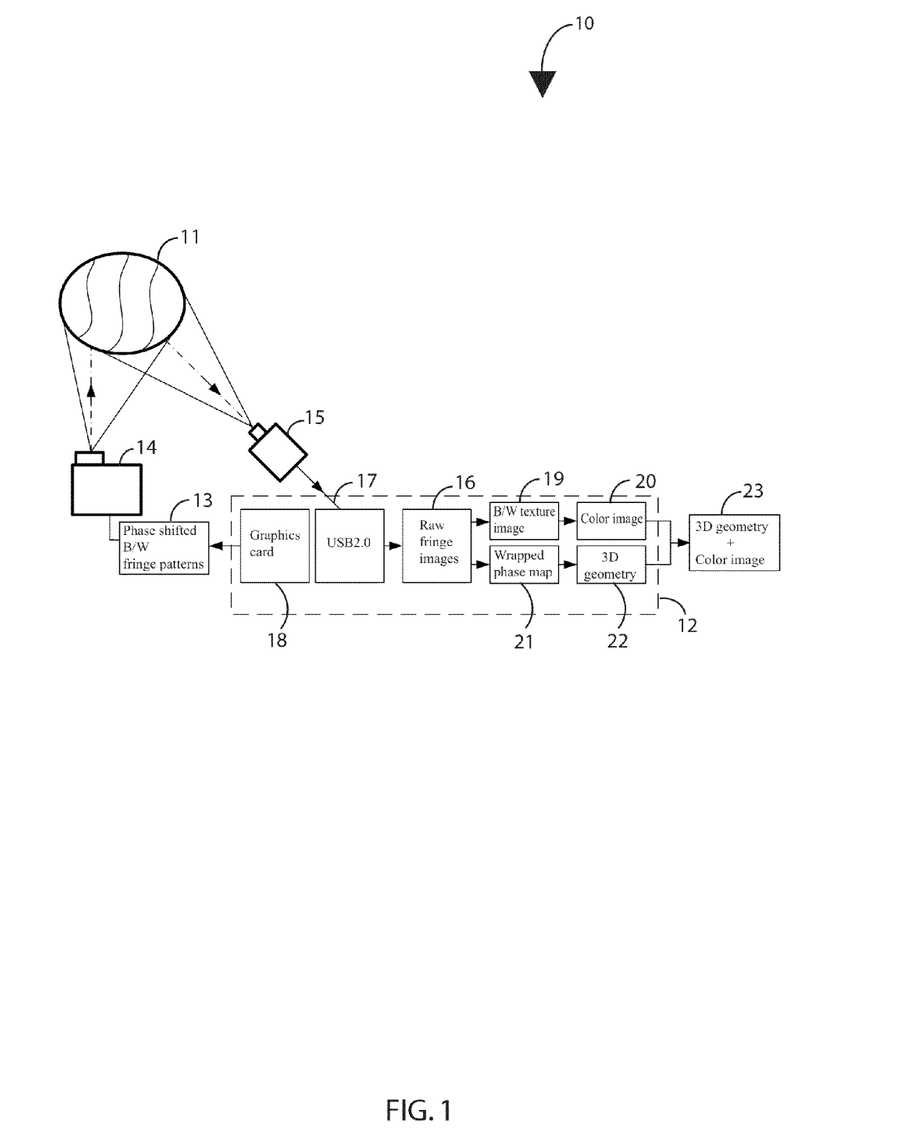
FIG. 1 is a layout of the present invention for simultaneous real time 3D shape measurement and color texture acquisition using the single color camera.

FIG. 1 shows a layout of a system 10 for simultaneous real-time three-dimensional geometry and color texture acquisition of an object 11. The system 10 comprises a system processor 12 for generating at least three phase shifted black and white fringe patterns 13 by a three-step phase shifting algorithm (not shown), a light projector 14 adapted to project the at least three phase shifted black and white fringe patterns 13 onto the object 11, and a color camera 15 for capturing the at least three phase shifted black and white fringe patterns 13 reflected from the object 11 to generate at least three raw fringe images 16. The at least three fringe images 16 are used to calculate a black and white texture image 19, which is further converted to a color image 20. At the same time, the fringe images 16 are used to calculate wrapped phase map 21 which is further processed to obtain 3D geometry 22 of the object 11. Thus, three fringe images 16 are sufficient to measure the 3D geometry 22 and the color image 20 acquisition simultaneously as shown in block 23. Since only three raw fringe images 16 are required, the present invention is suitable for real time 3D shape measurement.

The system processor 12 employs a graphics processing unit (GPU) (not shown) to assist in processing of the fringe patterns 13. The phase shifted fringe patterns 13 generated by the system processor 12 are sent by a graphics card 18 to the light projector 14. The light projector 14 is a digital light processing (DLP) projector with a resolution of 1024×768. The color camera 15 is a CMOS digital camera that has 1280×1024 image resolution, 8-bit image depth, and USB2.0 interface 17.

Figure 2:
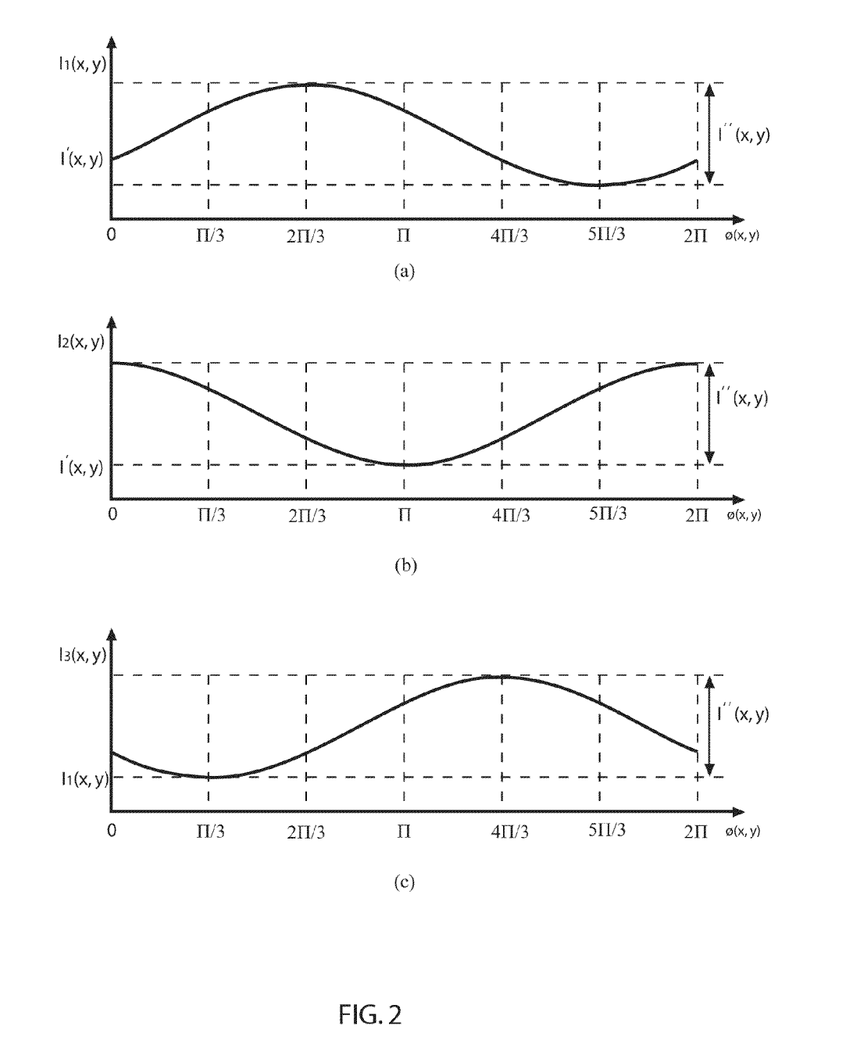
FIG. 2 is the cross sections of the three phase shifted sinusoidal fringe patterns with phase shift of $2\pi/3$ for use with the present invention.

One of the advantages of the phase shifting algorithm (not shown) is its point-by-point phase computation. As in FIG. 2 the at least three phase shifted fringe patterns 13 have a phase shift of $2\pi/3$. The intensity values of the fringe patterns can be written as, $$I_1(x,y)=I'(x,y)+I''(x,y)\cos[\varnothing(x,y)-2\pi/3]$$

$$I_2(x,y)=I'(x,y)+I''(x,y)\cos[\varnothing(x,y)]$$

$$I_3(x,y)=I'(x,y)+I''(x,y)\cos[\varnothing(x,y)+2\pi/3]$$

where I'(x, y) is an average intensity of the fringe patterns, I''(x, y) is an intensity modulation of the fringe patterns, ø(x, y) is a phase to be solved.

By solving the fringe pattern intensities, the phase $$\varnothing(x, y) = \tan^{-1}\left(\frac{\sqrt{3}[I_1 - I_3]}{2I_2 - I_1 - I_3}\right)$$

is obtained where the phase ø(x, y) ranges from $-\pi$ to $+\pi$. The wrapped phase map 21 is calculated using the fringe images 16 and phase value. The wrapped phase map 21 is processed to generate a continuous unwrapped phase map (not shown) by employing a phase unwrapping algorithm (not shown).

The system 10 is calibrated using a red and blue checkerboard (not shown) to estimate intrinsic and extrinsic parameters (not shown) of the system 10. A color image of the red and blue checkerboard is acquired by using the color camera 15 which makes the calibration simple. For the system 10, a regular black and white checkerboard image (not shown) is retrieved by taking either red or blue channel of the color image. Once the system 10 is calibrated, the continuous unwrapped phase map (not shown) is converted to co-ordinates with these calibrated system parameters (not shown).

The at least three intensity values of the black and white fringe patterns are solved to obtain the intensity value as:

$$I_{max}(x, y) = \frac{I_1 + I_2 + I_3 + \sqrt{3(I_1 - I_3)^2 + (2I_2 - I_1 - I_3)^2}}{3}$$

The raw fringe images 16 captured by the single chip color camera 15 contain mosaic patterns. Thus the raw fringe images 16 can be converted to the color image 20. Since the same set of fringe images 16 are used to obtain 3D geometry 22 and the color image 20 simultaneously, these are perfectly aligned with each other. Moreover, since the phase-shifting algorithm (not shown) allows point-by-point 3D shape measurement, pixel level resolution is possible.

The camera 15 uses a roll-shuttering mechanism and exposures each line of pixels sequentially. Its maximum speed under full resolution is 22 fps. In the present system 10, the camera resolution is set as 640×480 for data acquisition speed. At such a resolution, the maximum data acquisition speed is 70 fps. The exposure time used for data acquisition is 16.67 milliseconds to avoid the roll-shuttering problem of the camera 15 and the synchronization between the camera 15 and the projector 14. The system 10 switches the black and white fringe patterns 13 by software thereby drastically reducing the data acquisition speed. The system 10 projects black and white fringe patterns 13 to avoid the problem of the interference between the object surface color and the structured light color.

Figure 3:
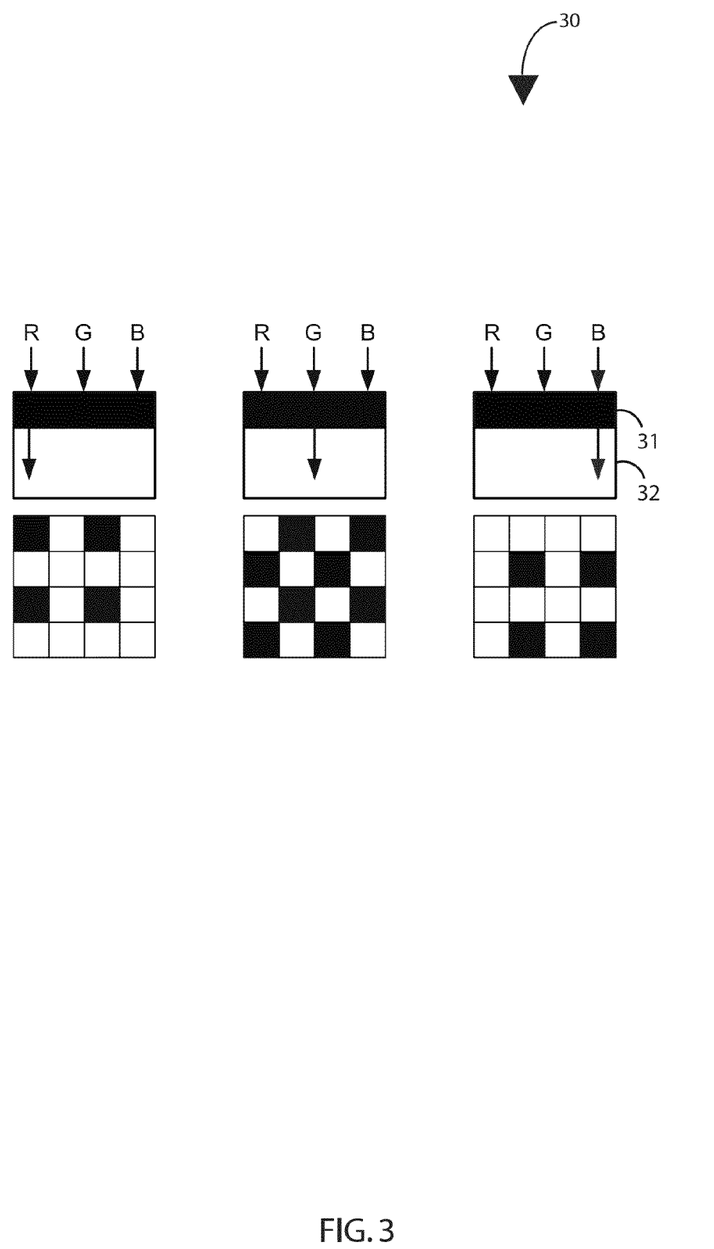
FIG. 3 shows the Bayer filter used in the present invention.

The color camera 15 has a single imaging sensor (not shown) with a Bayer mosaic filter 30 as in FIG. 3. A filter layer 31 is mounted on top of the imaging sensor array 32 pixel-by-pixel thereby allowing only one of three primary colors red, green, and blue to enter into one pixel of the imaging sensor array 32 to form the raw fringe images 16. The raw images 16 have a filter pattern of RGBG or GRGB that represents 50% green, 25% red, and 25% blue, hence it is also called RGBG or GRBG. The raw images 16 acquired by the single imaging sensor (not shown) has a pixel-by-pixel grayscale value.

Figure 4:
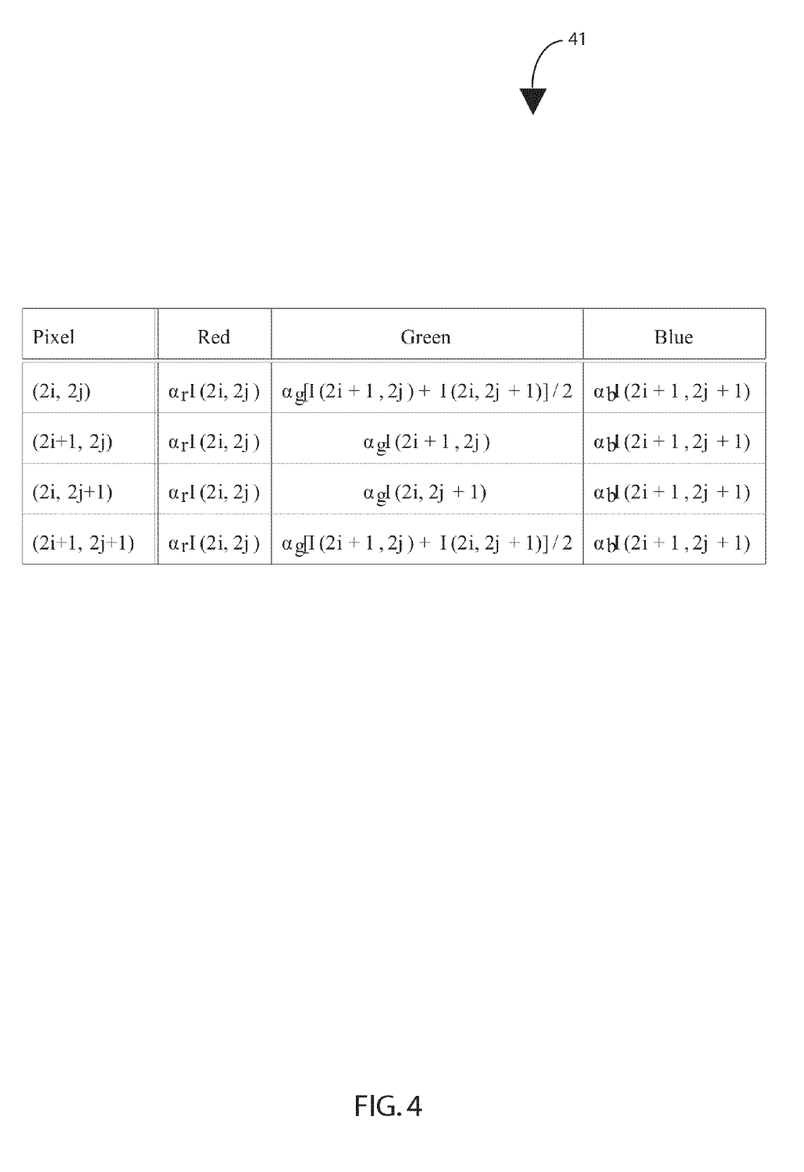
FIG. 4 shows the table for color pixel generation from the RGBG filter pattern.

The black and white texture image 19 is converted to a color image 20 by employing a demosaicing algorithm illustrated in table 41 shown in FIG. 4. The demosaicing algorithm illustrated in table 41 is a simple neighbor linear interpolation. For the RGBG filter pattern, pixel $(2i, 2j)$ represents red, $(2i, 2j+1)$ and $(2i+1, 2j)$ represent green, and $(2i+1, 2j+1)$ represents blue. The table 41 is used to generate the color image 20, where I (i, j) is the intensity of the raw images 16 for pixel (i, j), and $\alpha_r$, $\alpha_g$ and $\alpha_b$ are the coefficients used to balance three primary color channels, respectively. These coefficients are obtained from a step called white balance.

Figure 5:
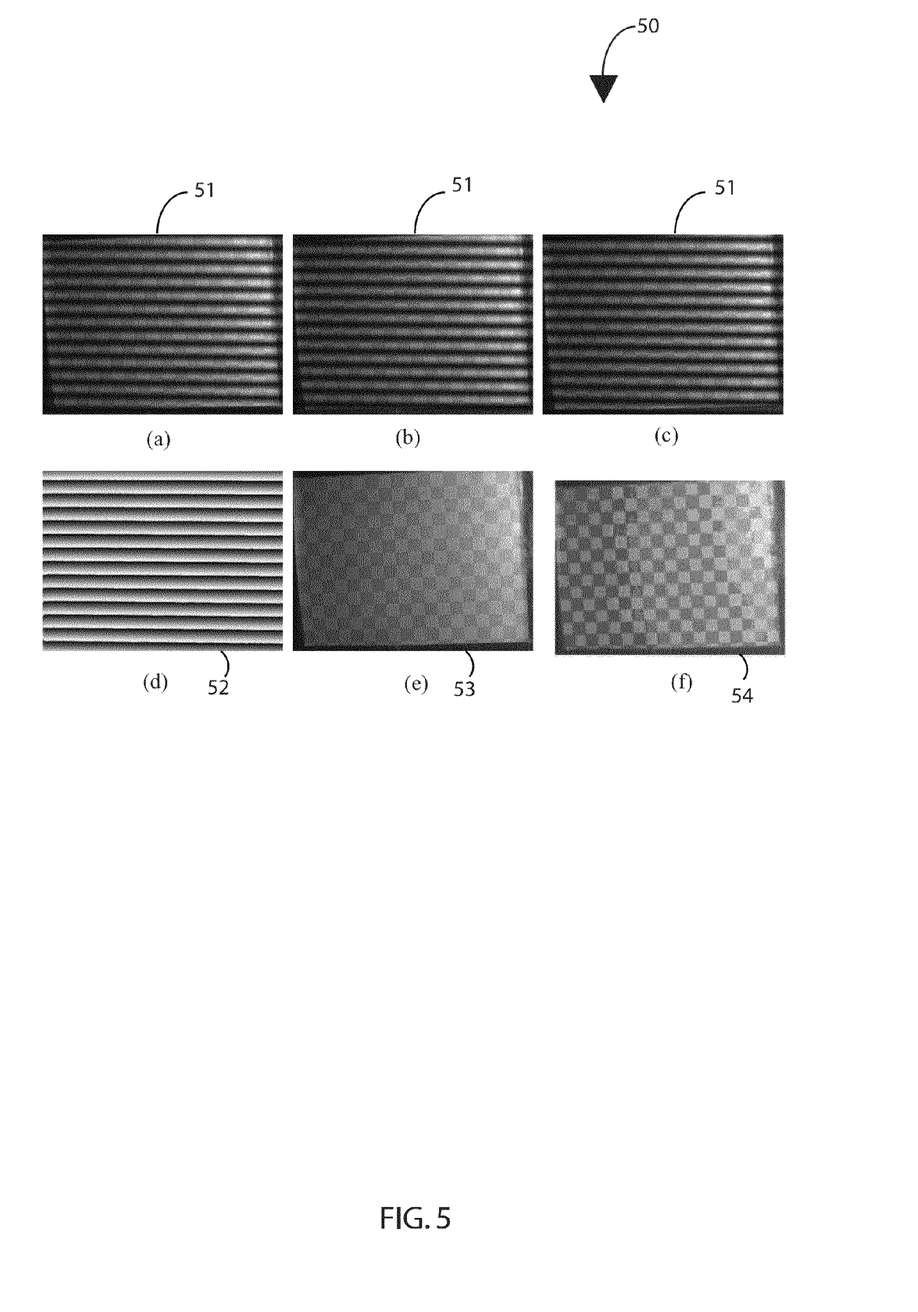
FIG. 5 shows the measurement result of the present invention of the flat checkerboard comprising of red and blue checker squares.

FIG. 5 shows the measurement result of a flat checkerboard 50 that comprises red and blue checker squares. FIGS. 5(a), 5(b), and 5(c) show the phase-shifted fringe images 51 acquired by the camera 15. FIG. 5(d) shows a wrapped phase map 52. Since three $2\pi/3$ phase-shifted fringe images 51 are used, by averaging these three fringe images 51 a black and white texture image 53 is obtained as shown in FIG. 5(e). The black and white texture image 53 is then converted to a color image 54 using the demosaicing algorithm illustrated in table 41 shown in FIG. 2. The color image 54 is shown in FIG. 5(f). The wrapped phase map 52 shown in FIG. 5(d) is unwrapped to obtain a continuous phase map that is further converted to co-ordinates using the calibrated system parameters.

Figure 6:
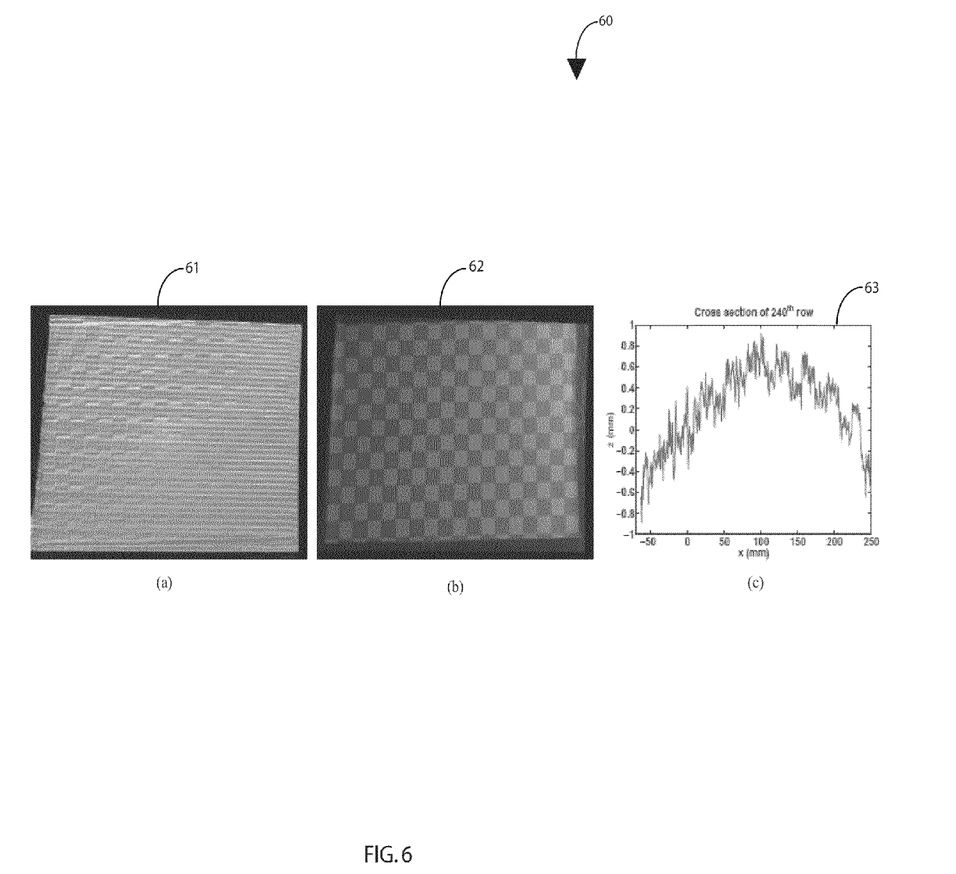
FIG. 6 is the reconstruction result of the present invention of the flat checkerboard shown in FIG. 5.

FIG. 6 shows the reconstruction result 60 of the flat checkerboard 50 shown in FIG. 5. FIG. 6(a) shows the 3D result rendered in shaded mode 61 which is smooth even though the object has red and blue color checker squares. The reason is that although the object surface color varies from area to area, the projected structured light is black and white, and the camera 15 captures fringe images 51 scattered from the checkerboard 50. FIG. 6(b) shows the 3D measurement result rendered with color texture mapping 62, and FIG. 6(c) shows $240^{th}$ row of the cross section 63 of the object. The reconstruction result 60 is smoothed by a 3×3 Gaussian filter to reduce the most significant random noises. Thus the present system 10 measures color objects successfully.

Figure 7:
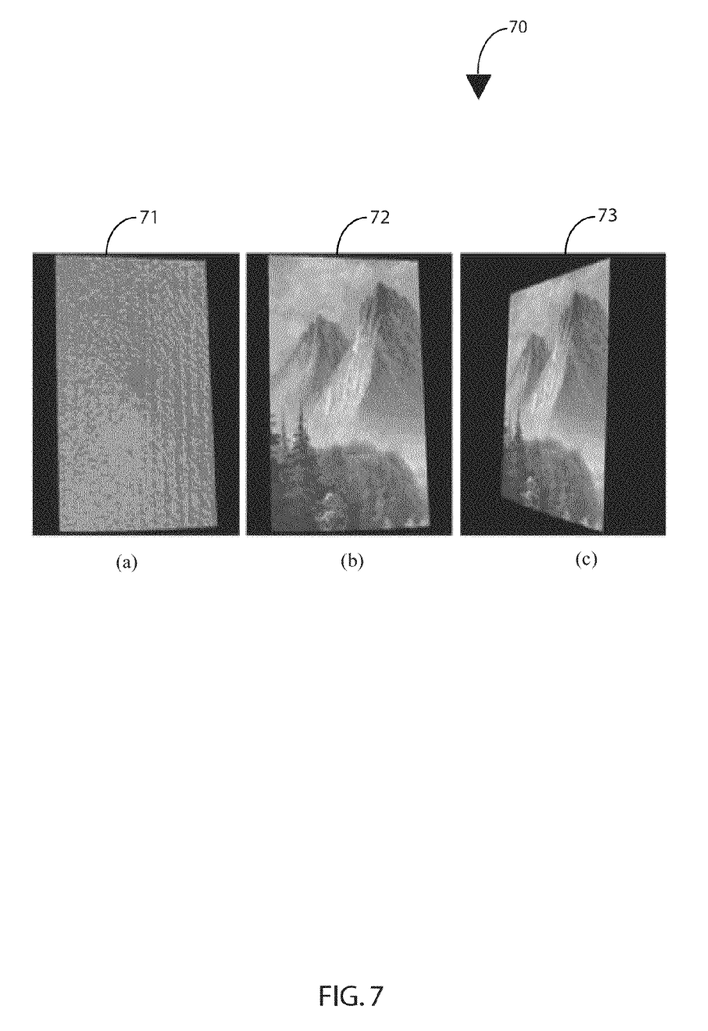
FIG. 7 shows the measurement result of the present invention of the color paint.

The present invention can measure an object with a variety of colors on its surface. For example, FIG. 7 shows the measurement result of a color paint 70. FIG. 7(a) shows the 3D measurement result of the color paint rendered in shaded mode 71, FIG. 7(b) shows the 3D result of the color paint rendered with color texture mapping 72 and FIG. 7(c) shows the 3D measurement result rendered with color texture image viewing from another angle 73. The measurement results of the color paint 70 shown in FIG. 7 is smoothed by the 3×3 Gaussian filter to reduce the most significant random noises. Thus the present method can measure the 3D geometry and color texture simultaneously for the object having drastic surface color variations.

Figure 8:
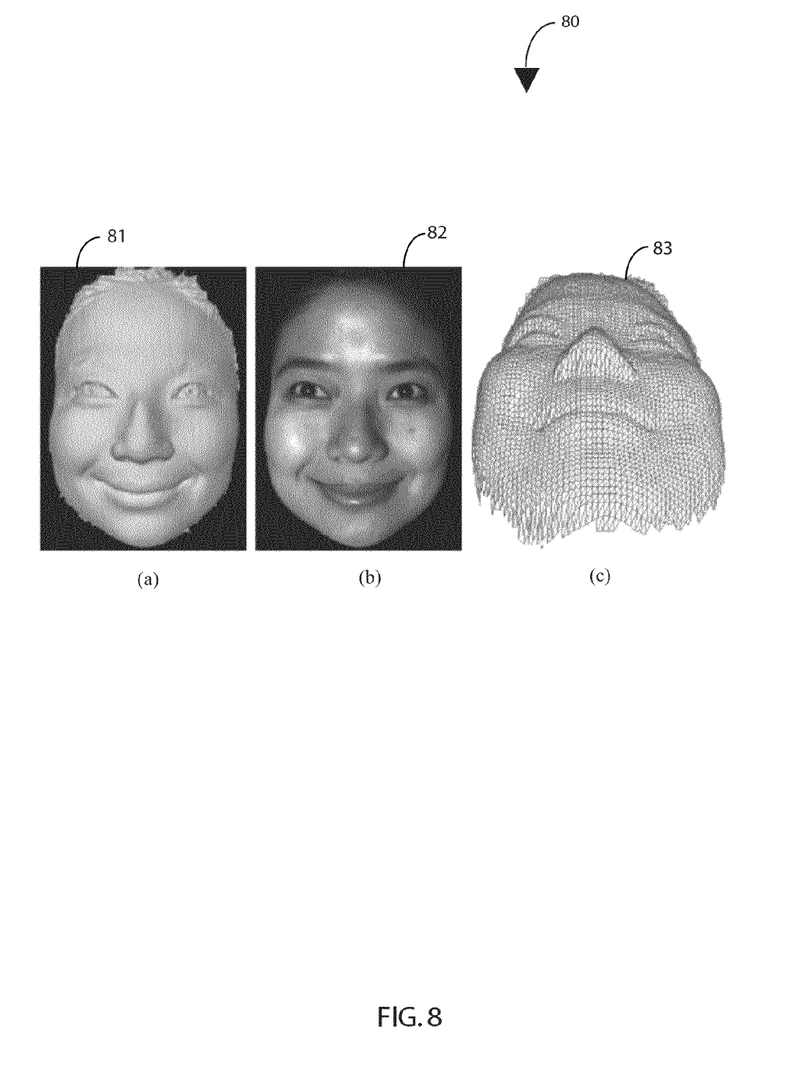
FIG. 8 shows the experimental result of the present invention of the human face.

Moreover, the present invention requires only three fringe images 16 to reconstruct the 3D geometry 22, the data acquisition speed is fast. For the system 10, the total data acquisition time is approximately 250 milliseconds. Therefore, it is possible to measure slowly moving object, such as a human face. For example, FIG. 8 shows the measurement result of a human face 80. FIG. 8(a) shows the 3D result of a human face rendered in shaded mode 81, where the face is smooth without significant noises. FIG. 8(b) shows the result with color texture mapping 82. FIG. 8(c) shows the result rendered in wireframe mode 83. The errors due to the motion of the head are smoothed by using a 7×7 Gaussian filter to reduce the most significant random noise. Thus the present invention can be used to measure human face with high quality.

Figure 9:
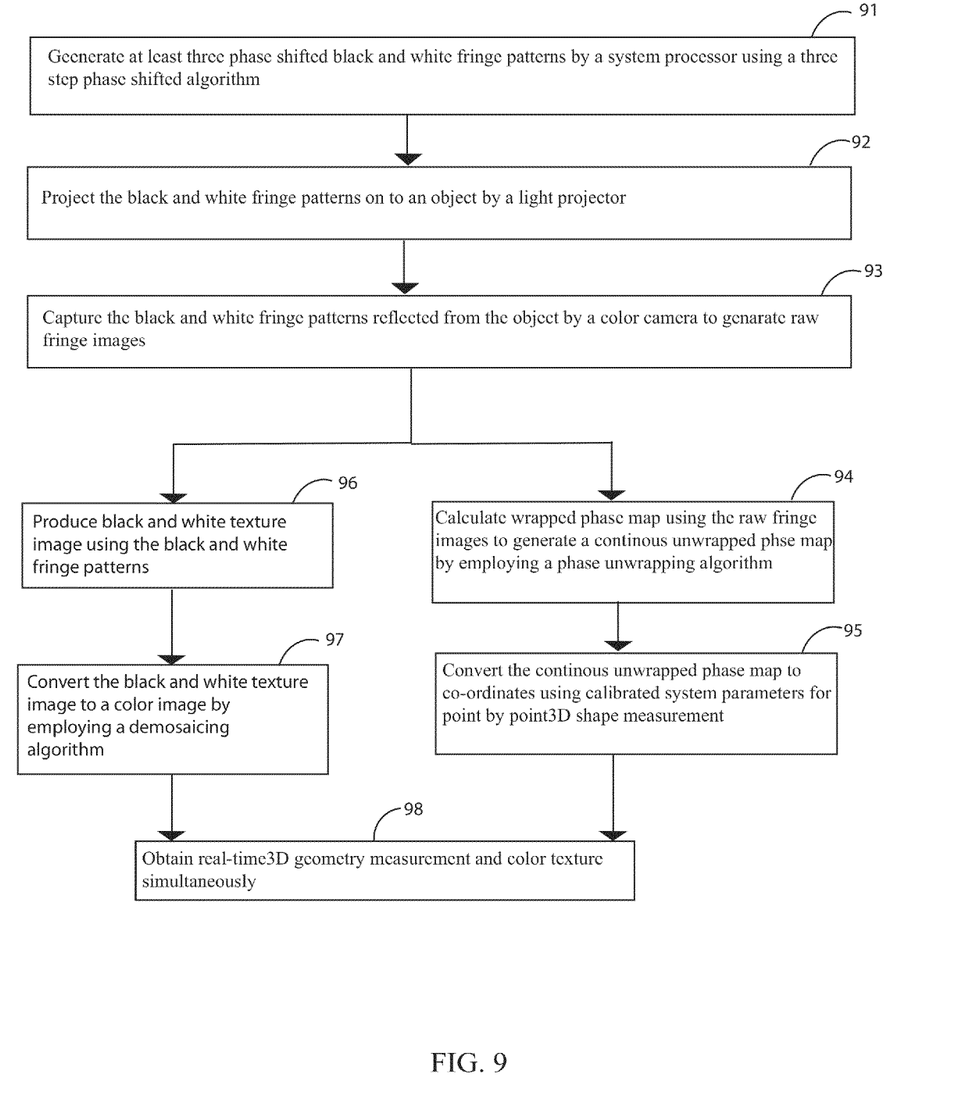
FIG. 9 shows the operational flow chart of the present invention.

FIG. 9 shows an overview of an operational flow chart 90 for the method for simultaneous real-time three-dimensional geometry and color texture acquisition. The system processor generates at least three phase shifted black and white fringe patterns using a three-step phase shifting algorithm as indicated at block 91. A light projector projects the black and white fringe patterns onto an object as indicated at block 92. A color camera captures the black and white fringe patterns reflected from the object to generate raw fringe images as indicated at block 93. A wrapped phase map is calculated using the fringe images to generate a continuous unwrapped phase map by employing a phase unwrapping algorithm as indicated at block 94 and the continuous unwrapped phase map is converted to co-ordinates using calibrated system parameters for point by point three-dimensional shape measurement as indicated at block 95. The same black and white fringe patterns are used to produce a black and white texture image as in block 96 and further the black and white texture image is converted to a color image by employing a demosaicing algorithm as indicated at block 97. Thus the real-time 3D geometry and color texture acquisition are obtained simultaneously as indicated at block 98.

The present system is applicable in areas including portable mark based skull geometric surface acquisition systems, portable markerless 3D surface measurement systems, integrated facial animation systems, online 3D avatar systems for online virtual social worlds and gaming, reverse engineering for capture complicated objects with color texture, and facial expression acquisition systems.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A system for simultaneous real-time three-dimensional geometry and color texture acquisition of an object, comprising:
    a system processor for generating at least three phase shifted black and white fringe patterns by a three-step phase shifting algorithm;

a light projector adapted to project the at least three phase shifted black and white fringe patterns onto the object, the light projector being electrically connected with the system processor; and a color camera for capturing the at least three phase shifted black and white fringe patterns reflected from the object to generate at least three raw fringe images;

wherein the raw fringe images generated by the color camera calculate a wrapped phase map to generate a continuous unwrapped phase map by employing a phase unwrapping algorithm and converting the continuous unwrapped phase map to co-ordinates using calibrated system parameters for point by point three-dimensional shape measurement; producing a black and white texture image by using the raw fringe images; and converting the black and white texture image to a color image by employing a demosaicing algorithm for simultaneous real-time three-dimensional geometry and color texture acquisition.

2. The system of claim 1 wherein the light projector is a digital light processing (DLP) projector with a resolution of 1024×768.

3. The system of claim 1 wherein the color camera is a CMOS digital camera featuring 1024×768 resolution, eight bit image depth, USB 2.0 interface and 22fps maximum speed under full resolution.

4. The system of claim 1 wherein the color camera has a single imaging sensor with a Bayer mosaic filter.

5. The system of claim 1 wherein the system processor employs graphics processing unit (GPU) to assist in processing of the fringe patterns.

6. A method for simultaneous real-time three-dimensional geometry and color texture acquisition, comprising the steps of:

generating at least three phase shifted black and white fringe patterns with a phase shift of $2\pi/3$ by a system processor utilizing a three step phase shifting algorithm and sending the fringe patterns to a light projector;

projecting the phase shifted fringe patterns onto an object by the light projector which is electrically connected with the system processor;

capturing the phase shifted fringe patterns reflected from the object by a color camera to generate at least three raw fringe images;

calculating a wrapped phase map using the raw fringe images;

processing the wrapped phase map to generate a continuous unwrapped phase map by employing a phase unwrapping algorithm and converting the continuous unwrapped phase map to co-ordinates using calibrated system parameters for point by point three-dimensional shape measurement;

producing a black and white texture image by using the raw fringe images; and converting the black and white texture image to a color image by employing a demosaicing algorithm.

7. The method of claim 6 wherein the phase shifted black and white fringe patterns are generated with intensity values by the three step phase shifting algorithm, the intensity values as:

$$I_1(x,y)=I'(x,y)+I''(x,y)\cos[\varnothing(x,y)-2\pi/3]$$

$$I_2(x,y)=I'(x,y)+I''(x,y)\cos[\varnothing(x,y)]$$

$$I_3(x,y)=I'(x,y)+I''(x,y)\cos[\varnothing(x,y)+2\pi/3]$$

where I'(x, y) is an average intensity of the fringe patterns, I''(x, y) is an intensity modulation of the fringe patterns, $\varnothing$(x, y) is a phase of the fringe patterns.

8. The method of claim 6 wherein the color camera has a single imaging sensor with a Bayer mosaic filter.

9. The method of claim 6 wherein the Bayer mosaic filter is mounted on top of the imaging sensor pixel-by-pixel thereby allowing only one of three primary colors red, green, and blue to enter into one pixel of the image sensor to form the raw fringe images.

10. The method of claim 6 wherein the raw fringe images have a filter pattern of RGBG or GRGB that represents 50% green, 25% red, and 25% blue.

11. The method of claim 6 wherein the raw fringe images acquired by the single imaging sensor have a pixel-by-pixel grayscale value.

12. The method of claim 6 wherein the wrapped phase map is generated using the raw fringe images and a phase value solved from at least three intensity values of the black and white fringe patterns, the phase value as:

$$\varnothing(x,y) = \tan^{-1}\left(\frac{\sqrt{3}[I_1 - I_3]}{2I_2 - I_1 - I_3}\right)$$

where the phase $\varnothing$(x, y) ranges from $-\pi$ to $+\pi$.

13. The method of claim 6 wherein the system is calibrated with a red and blue checkerboard for estimating intrinsic and extrinsic parameters of the system.

14. The method of claim 6 wherein the black and white texture image is generated using the raw fringe images and an intensity value solved from at least three intensity values of the black and white fringe patterns, the intensity value as:

$$I_{max}(x,y) = \frac{I_1 + I_2 + I_3 + \sqrt{3(I_1-I_3)^2 + (2I_2-I_1-I_3)^2}}{3}.$$

15. The method of claim 6 wherein the black and white texture image can be converted to the color image using a demosaicing algorithm.

* * * * *